United States Patent

Bronisz et al.

[11] 4,315,323
[45] Feb. 9, 1982

[54] CASSETTE RECORDER SYSTEM FOR LOADING PROGRAMS

[75] Inventors: Larry F. Bronisz, Holliston; Eugene V. Sahr, Littleton, both of Mass.

[73] Assignee: Data General Corporation, Westboro, Mass.

[21] Appl. No.: 123,757

[22] Filed: Feb. 22, 1980

Related U.S. Application Data

[63] Continuation of Ser. No. 794,015, May 5, 1977, abandoned.

[51] Int. Cl.³ .................................................. G06F 3/08
[52] U.S. Cl. ..................................... 364/900; 360/74.1
[58] Field of Search ................. 360/74.1, 71; 307/273; 364/200 MS File, 900 MS File

[56] References Cited

U.S. PATENT DOCUMENTS

| | | | |
|---|---|---|---|
| 3,330,915 | 7/1967 | Roberts et al. | 360/71 X |
| 3,611,162 | 10/1971 | Tochitani | 307/273 X |
| 3,668,423 | 6/1972 | Cough | 307/273 X |
| 4,112,501 | 9/1978 | Önnestam | 364/900 |

*Primary Examiner*—Harvey E. Springborn
*Attorney, Agent, or Firm*—Donald Brown

[57] ABSTRACT

Cassette recorder system for loading programs into a computer, said system comprising means for generating data signals from tape representing said program signals and means for recognizing the time spacing of said control signals to inhibit or enable the loading of said data into a computer.

2 Claims, 2 Drawing Figures

CASSETTE RECORDER SYSTEM FOR LOADING PROGRAMS

This is a continuation of application Ser. No. 794,015 filed May 5, 1977, now abandoned.

BACKGROUND OF THE DISCLOSURE

This invention is directed to a new and improved system and method for loading diagnostic computer programs into a computer for the purpose of diagnosing computer malfunctions.

Field service engineering has as one of its major functions the rapid diagnoses of computer malfunctions. Diagnostic programs play a large part in providing field service engineers with a powerful tool to permit rapid detection of the causes of computer errors. In the past the diagnostic programs were generally loaded into the computer memory from a prepunched paper tape and fed into the computer from a conventional paper tape reader coupled to the computer.

While the use of paper tapes for diagnostic purposes are generally acceptable, paper tapes have limited storage capacity and are prone to be easily damaged if used continuously by field service personnel.

The use of a number of paper tapes to store a number of diagnostic programs is also quite time consuming and does not lend itself readily to the rapid servicing of computers by field service personnel. Accordingly, a new and improved system was required for field service use to permit the rapid servicing of computers.

The present invention provides in a single cassette unit such system which operates under the control of the computer it is used to diagnose.

BRIEF DESCRIPTION OF THE DISCLOSURE

This invention is an improvement over the invention shown in U.S. patent application Ser. No. 694,442 filed June 9, 1976. In particular this invention provides means to control the operation of the tape recorder drive as well as the data input section to enable or inhibit program entry from a tape into a computer.

In particular, in this system, the computer itself generates under program control NIOP signals in a predetermined time sequence to permit the diagnostic program to be loaded and then stored in said computer.

DETAILED DESCRIPTION OF THE DISCLOSURE

Figure 1:
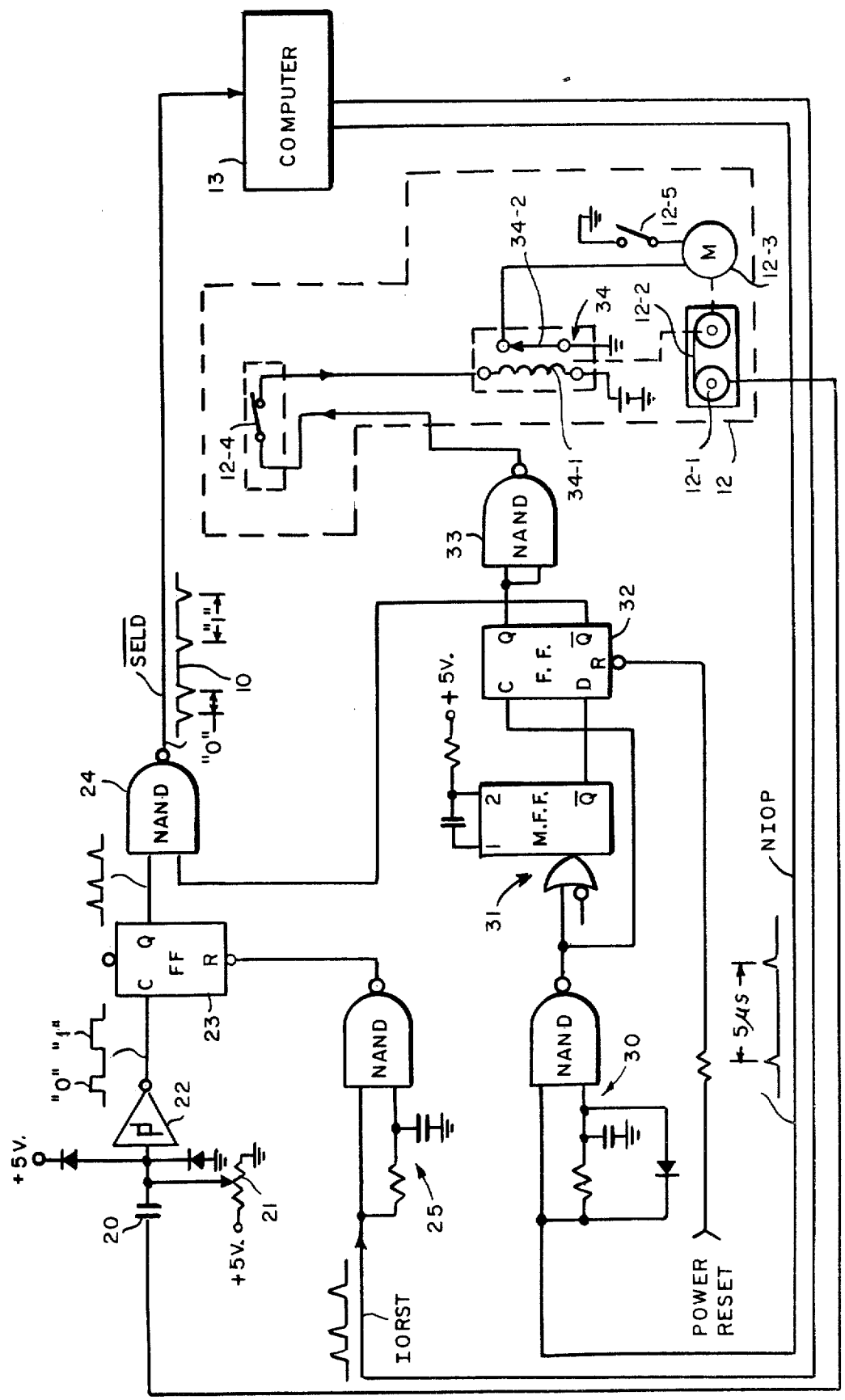
FIG. 1 illustrates in block diagram form the preferred embodiment of the system of this invention.

Reference should be had to FIG. 1 which shows the preferred embodiment of the disclosure. Reference should also be had to U.S. patent application Ser. No. 694,442 filed June 9, 1976 which is incorporated herein by reference hereto.

At 12 there is a tape recorder such as Panasonic Model RQ 413 SD which has a conventional tape drive motor 12-3 for a cassette 12-1 using conventional audio magnetic tape 12-2. On the tape 12-2 there is stored on at least one channel of a two channel tape an executive program paired with one or more diagnostic programs (data). Each program comprises "0"s and "1"s represented by two different audio frequencies (sine waves) e.g., one approximately 3.0 KHZ and the other approximately 1.5 KHZ.

Preferably one frequency is double the other. The higher frequency represents a "zero" bit and the lower frequency represents a "one" bit. Thus the data stored on the tape representing the executive or diagnostic programs is a sequence of "one's" and "zero's."

The data signal from tape 12-1 is provided from the last stage audio output of the cassette recorder 12 to the input of Schmitt trigger circuit 22 having an input d.c. blocking capacitor 20. A variable bias level is provided by a potentiometer 21.

Two limiting diodes are shown at 22-1 and 22-2 for clipping the input to Schmitt trigger so as not to overdrive it. The output of the Schmitt trigger 22 (e.g., a TI 7414) is a pulse waveform where an "0" is a smaller width pulse than a "1" bit pulse.

The output of the Schmitt trigger is provided to a flip-flop 23 e.g., a "D" type which is reset via a timing signal IORST (a low signal) generated by a computer 13.

In some cases where the computer 13 provides a high output signal, and the "D" type flip-flop is resettable on a low signal an inverter network shown at 25 will be used as would be obvious to those skilled in the art.

If a "D" type flip-flop which is resettable on a high signal is used, the inverter network 25 can be dispensed with. The pulse outputs from the Schmitt trigger 22 causes the flip-flop 23 to be set. The Q output therefrom is inverted by a Nand buffer 24 e.g. a TI 7438 and $\overline{\text{SELD}}$ is transmitted to the computer 13.

$\overline{\text{SELD}}$ represents the data signals of the programs being loaded into the computer. The computer 13 issues IORST (input/output reset) signals also known as a timing signal to reset the flip-flop 23 so that another output signal (leading edge-high going) can be detected.

The output from the Nand buffer 24 are pulses known as $\overline{\text{SELD}}$. The spacing between adjacent pulses determines whether a "1" or a "0" has been read from the tape 12-2.

The computer 13 detects the low level (see waveform at 10) of $\overline{\text{SELD}}$. Upon detection of the low level the IORST signal is sent out to reset flip-flop 23 thereby causing $\overline{\text{SELD}}$ to go high.

The next signal to the C input of flip-flop 23 causes the $\overline{\text{SELD}}$ pulse to again reappear. This process continues, repetitively as the data (e.g., diagnostic program from tape 12-2) is fed into the computer 13.

Figure 2:
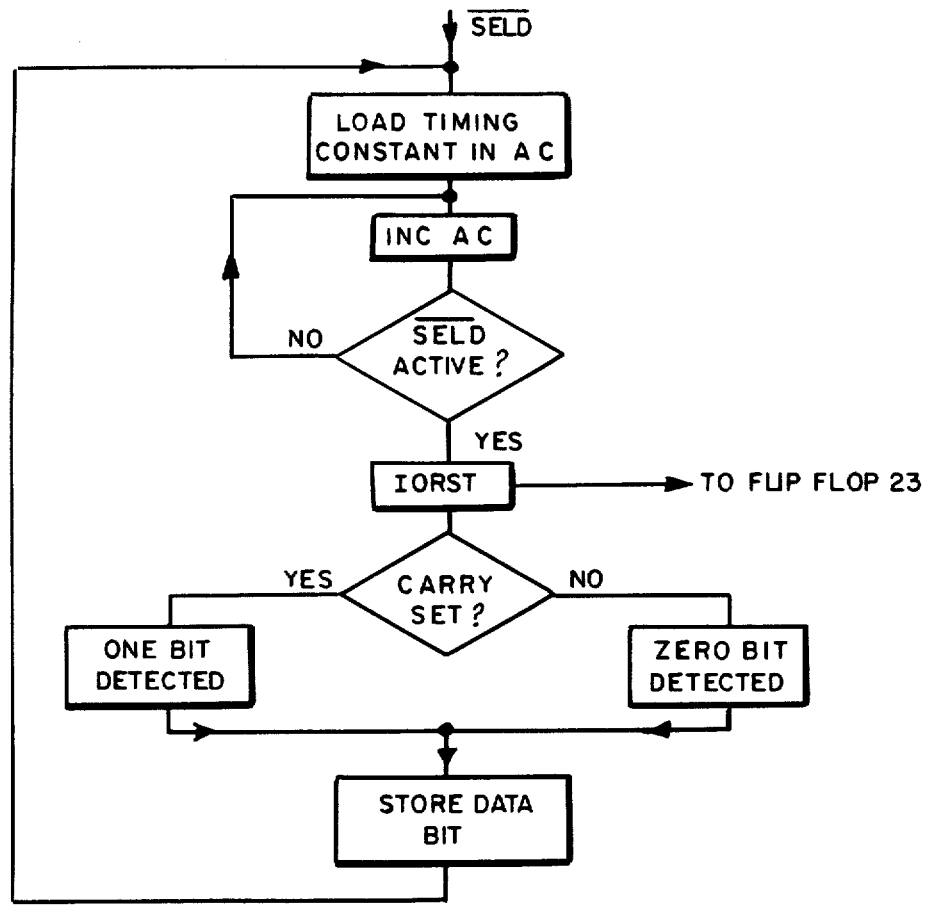
FIG. 2 is a flow chart illustrating the program for generating the IORST signals.

The $\overline{\text{SELD}}$ signal is cabled to the back panel of the computer 13 (e.g., a NOVA 840 computer) and a computer program generated in accordance with the flow chart shown in FIG. 2 when running will cause the recognition of the spacing between bits to determine if a "1" or a "0" bit is present, and also provide the IORST signal to reset flip-flop 23. With the NOVA 840 computer the constant loaded in the accumulator would be 177561 in octal.

The program written using conventional NOVA machine language according to the flow chart of FIG. 2 will also cause storing of the bits of the programs in memory. IORST signals are generated in the bootstrap by the instructions at memory location 1007, and in the executive program at memory locations 7551 for all NOVA or ECLIPSE computers, or 7552 for the microNOVA computer.

An external pulse generator could also provide the IORST timing signals in order to check out the operation of the cassette recorder 10.

The computer 13 also generates a signal NIOP which is to control the motion of the tape 12-2 by controlling the tape drive motor 12-3 of the cassette recorder 12. NIOP also causes the enabling or disabling of the Nand buffer 24 thereby preventing generation of the "1" and "0" bits of $\overline{SELD}$. NIOP is generated under computer program control as desired by the user of the computer 13 e.g., NOVA or ECLIPSE line of Data General Corporation computers.

NIOP is provided to a buffer inverter network 30 to prevent noise pulses from affecting the system. The buffer may be a TI 7400 or a Fairchild 9002. The output from the buffer network 30 will trigger a retriggerable resettable Monostable Multivibrator (M.F.F.) e.g., Fairchild 9602 shown as the logic device 31 as is conventional in the integrated circuit industry.

When the output of Nand buffer 30 goes high, the M.F.F. circuit 31 will provide a low output at $\overline{Q}$. $\overline{Q}$ will remain low for about 5.5 microseconds. Additionally, the rising edge of the high going output signal from 30 causes a "D" type flip-flop 32 to be set through the clock input.

Setting of flip-flop 32 disables or inhibits Nand buffer 24. The $\overline{Q}$ output going high causes Nand buffer 33 to go low which causes relay coil 34-1 to be energized thereby opening up contacts 34-2 at the relay 34 which shuts the power to tape drive motor 12-3.

If the computer 13 issues another NIOP pulse within 5.5 microseconds of the first NIOP pulse the one shot multivibrator is retriggered. The rising edge of the output 30 (i.e. the trailing edge of NIOP) will reset the "D" flip-flop 32. This causes the $\overline{Q}$ to go high to enable Nand 24 and the tape drive motor 12-3 to begin turning on when Q goes low.

If no second NIOP pulse appears with 5.5 microseconds, the M.F.F., $\overline{Q}$ of 31 goes high and the recorder motor remains de-energized. Thus two NIOP pulses within a preset time frame are needed to initiate tape movement.

The flip-flop 32 is also controlled by a power reset signal caused by depressing the stop button of the Panasonic recorder. The power reset signal is used to clear the flip-flop 32 in the event that the state of flip-flop 32 is such as to prevent the motor 12-3 from being driven.

The pause button and its respective switch 12-4 of the Panasonic recorder is reconnected as shown to allow the tape 12-2 motor to be driven by depressing to Rewind/Review or FF/CUE buttons on the Panasonic recorder e.g., 12-5. The depression of the pause button opens the switch 12-4 but does not enable data to be read into computer from the tape 12-2. The playback button of the Panasonic recorder is depressed to permit the loading of data into the computer from the tape under control of computer generated signals NIOP and IORST.

In order to load a program from the tape 12-2 into the computer 13 the following steps are followed:

(1) a bootstrap program is manually loaded into the computer such as a NOVA 840 computer sold by the DATA GENERAL CORPORATION by setting panel instruction switches thereof;

(2) thereafter the computer operating with the bootstrap program instructions is used to control the cassette recorder after it is placed to the playback mode to load into memory an executive program which is used to locate the desired diagnostic program on the tape; and (3) the diagnostic program once located is thereafter loaded into the computer.

The user selects the desired diagnostic program by using a CRT or teletype (TTY) and its keyboard to type in the code for the desired program when the computer asks that a diagnostic program identificating code to be inserted into the computer (see instructions located at memory locations 7712 and 7713).

The instructions for the bootstrap program to load the executive program into the computer memory is shown below as instructions 1000 to 1016.

The instructions will operate any of the Data General Corporation computers as listed adjacent to the timing constants listed below the bootstrap program.

The appropriate timing constant is entered at instruction 01004 in the bootstrap program to permit IORST signals to be generated as shown in FIG. 2. Thus for the N 1200 (NOVA 1200) the timing constant inserted into the accumulator would be 177666.

In the timing constant chart the abbreviation "N" stands for NOVA.

The following listing(s) are the appropriate bootstrap program instruction(s) and executive program instruction(s) for entering a diagnostic program into the computer 13 from the tape 12-1.

The executive program generates the NIOP control signals as shown to control the tape drive motor 12-3. The pages following the executive program represents the symbol table used in generating the instructions.

```
0001  BURIS MACRO REV 04.00            13:33:33  10/29/76
.01                          ;BOOTSTRAP IS A PROGRAM FOR READING IN
.02                          ;AN CASSETTE EXECUTIVE PROGRAM INTO A
.03                          ;D G C COMPUTER
.04
.05
.06                          ;THIS ROUTINE MAY BE ENTERED INTO THE CPU AT
.07                          ;ANY LOCATION EXCEPT LOCATION 777 TO 777
.08                          ;IN PAGE ZERO. THE EXEC IS LOADED INTO THESE
.09                          ;LOCATIONS.
10
                             .TITL BOOTSTRAP
12                           .ENT BEG
13      001000               .LOC  1000
14
15  01000 152440  BEG:  SUBO  2,2                  ;CLEAR AC2
16  01001 176440         SUBU  3,3                  ;CLEAR AC3
17  01002 024402         LDA   1,KONX              ;GET TIMING CONSTANT
```

```
18 01003 125401          INC     1,1,SKP         ;INC CONSTANT
19 01004 000000  KONX:   0                       ;CONSTANT FOR BOOTSTRAP
20 01005 063600          SKPDN   0               ;IS DONE SET ?
21 01006 000775          JMP     .-3             ;NO
22 01007 062677          IORST                   ;YES, CLEAR DONE
23 01010 175203          MOVR    3,3,SNC         ;MOVE BIT FOUND
24 01011 000771          JMP     .-7             ;NOT FINISHED WITH 16 BITS
25 01012 055177          STA     3,177,2         ;STORE WORD AWAY
26 01013 151400          INC     2,2             ;BUMP ADDRESS POINTER
27 01014 014177          DSZ     177             ;FINISHED WITH EXEC YET ?
28 01015 000764          JMP     .-14            ;GO BACK FOR NEXT WORD
29 01016 004200          JSR     200             ;START UP EXEC
30
31                       ;THE TIMING CONSTANTS ARE AS FOLLOWS FOR DIFFERENT CPU
32                       ;KONX EQUALS
33
34                               ;177742    NOVA
35                               ;177616    SUPERNOVA SC
36                               ;177644    SUPERNOVA CORE
37                               ;177666    NOVA 1200
38                               ;177561    NOVA 800/820/840
39                               ;177606    NOVA 830
40                               ;177554    NOVA 2    8K
41                               ;177571    NOVA 2    16K
42                               ;177624    NOVA 3    8K
43                               ;177617    NOVA 3    16K
44                               ;177606    NOVA 3    SC
45                               ;177543    ECLIPSE 4 WAY CORE
46                               ;177536    ECLIPSE 8 WAY CORE
47                               ;177571    ECLIPSE NON-INTERLEAVED
48                               ;177505    ECLIPSE SC

0001 .MAIN MACRO REV P3.00                       14:22:32 01/31/77
01
02
03
04
05
06
07
08                       ;THIS IS A STAND ALONE EXECUTIVE ROUTINE FOR THE
09                       ;CASSETTE RECORDER USING DIAGNOSTICS.
10
11       007317          .LOC 7317
12
13                       ;BEGIN THE BINARY LOADER AND EXEC ROUTINE
14
15 07317 000461 CONST:   WHOA-CONST+2
16 07320 004443 A2001    JMP     EXEC
17 07321 170707          170707
18 07322 170707          170707
19 07323 054446 EXEC:    STA     3,FROM          ;WHERE WE CAME FROM
20 07324 030444          LDA     2,FROMX
21 07325 156400          SUB     2,3
22 07326 021400          LDA     0,0,3           ;GET TIMING CONSTANT
23 07327 040567          STA     0,KONST
24 07330 000567          JMP     KONA
25 07331 030441 SIZIT:   LDA     2,K1000         ;FIND TOP OF MEMORY
26 07332 155001          MOV     2,3,SKP
27 07333 157000          ADD     2,3
28 07334 173132          MOVZL#  3,3,SZC
29 07335 000407          JMP     .+7             ;FOUND END OF MEMORY
30 07336 021400          LDA     0,0,3           ;ORIGINAL VALUE
31 07337 055400          STA     3,0,3           ;STORE ADDRESS
32 07340 025400          LDA     1,0,3           ;GET ADDRESS BACK
33 07341 041400          STA     0,0,3           ;STORE ORIG. VALUE BACK
34 07342 136415          SUB#    1,3,SNR
35 07343 000770          JMP     SIZIT+2
36 07344 152000          ADC     2,2             ;END OF MEMORY
37 07345 173000          ADD     3,2
38 07346 050421          STA     2,MSIZE         ;STORE MEMORY TOP AWAY
39 07347 024424 MOVE:    LDA     1,CON           ;GET # OF WORDS TO MOVE
40 07350 044747          STA     1,CONST
41 07351 010745          ISZ     CONST           ;MUST BE HERE !
42 07352 132400          SUB     1,2
43 07353 034412          LDA     3,TOP
```

```
!PAA2 .MAIN
01 07354 021400           LDA     0,0,3           ;GET INSTRUCTION
02 07355 041000           STA     0,0,2           ;STORE UP TOP
03 07356 151400           INC     2,2             ;BUMP MEMORY ADDRESS
04 07357 175400           INC     3,3             ;BUMP LOADER ADDRESS
05 07360 014737           DSZ     CONST           ;DECREMENT # OF WORDS TO MOVE
06 07361 000773           JMP     .-5
07 07362 060300 XA:       NIOP    0
08 07363 014404           DSZ     MSIZE
09 07364 002403           JMP     @MSIZE          ;JMP TO TOP OF MEMORY
10 07365 000177 TOP:      177
11 07366 000177 ADDRL:    177
12 07367 000000 MSIZE:    0
13 07370 002413 FROMX:    13
14 07371 000000 FROM:     0               ;ADDRESS OF BOOTSTRAP
15 07372 001000 K1000:    1000
16 07373 000467 CON:      HHOA-CONST+1
17 07374 155555 DIGID:    155555          ;DIAG ID
18 07375 000077 C77:      77                      ;MASK FOR DEVICE CODE
19 07376 175400 SIZX:     INC     3,3             ;SET FOR DEVICE CODE
20 07377 025400           LDA     1,0,3           ;GET DEVICE CODE
21 07400 030775           LDA     2,C77           ;GET MASK
22 07401 133405           AND     1,2,SNR         ;AC2 =DV CODE
23 07402 000727 SIZZ:     JMP     SIZIT           ;FORGET DEVICE CODE
24 07403 024757           LDA     1,XA
25 07404 147000           ADD     2,1             ;CHANGE DEV. CODE OF INST.
26 07405 044755           STA     1,XA
27 07406 024451           LDA     1,XB
28 07407 147000           ADD     2,1
29 07410 044447           STA     1,XB
30 07411 024536           LDA     1,XC
31 07412 147000           ADD     2,1
32 07413 044534           STA     1,XC
33 07414 000541           JMP     SIZR            ;GO SET REST OF INST.
34
35                                        ;BEGIN LOADING THE DIAGNOSTIC
36 07415 030757 NOW:      LDA     2,DIGID         ;GET ID
37 07416 004524           JSR     OUT             ;GET A WORD
38 07417 156414           SUB#    2,3,SZR         ;DO WE HAVE A DIAGNOSTIC
39 07420 000776           JMP     .-2             ;NO
40 07421 004521           JSR     OUT             ;MAYBE
41 07422 156414           SUB#    2,3,SZR         ;TRY AGAIN
42 07423 000773           JMP     .-5             ;NO GO BACK TO SQUARE 1
43 07424 004516           JSR     OUT             ;FIRST WORD IS CHECKSUM
44 07425 171000           MOV     3,2
45 07426 004514           JSR     OUT             ;NEXT IS WORDCOUNT
46 07427 054434           STA     3,KOUNT
47 07430 173000           ADD     3,2             ;ADD TO CHECKSUM
48 07431 004511           JSR     OUT
49 07432 054432           STA     3,ADDRT         ;ADDRESS TO BEGIN STORING
50 07433 173000           ADD     3,2             ;BUMP CHECKSUM
51 07434 004506           JSR     OUT             ;STORE AWAY FILE NUMBER
52 07435 054557           STA     3,FNO
53 07436 173000           ADD     3,2             ;ADD TO CHECKSUM
54 07437 024556           LDA     1,SNO           ;ARE WE SEARCHING FOR A DIAG
55 07440 125215           MOV#    1,1,SNR
56 07441 000418           JMP     LOAD            ;NO - LOAD THE ONE WE'VE GOT
!PAA3 .MAIN
01 07442 136415           SUB#    1,3,SNR         ;YES - HERE OR PAST
02 07443 000406           JMP     LOAD            ;HERE
03 07444 020553           LDA     0,CR            ;PRINT CR AND LF
04 07445 004453           JSR     PUTC
05 07446 024546           LDA     1,FNO
06 07447 004526           JSR     BNOCT           ;PRINT FILE JUST PAST
07 07450 000745           JMP     NOW
08 07451 004471 LOAD:     JSR     OUT             ;DATA RECORD WORD
09 07452 054412           STA     3,@ADDRT        ;STORE IT AWAY
10 07453 173000           ADD     3,2             ;ADD TO CHECKSUM
11 07454 010410           ISZ     ADDRT           ;BUMP WORD ADDRESS
12 07455 014406           DSZ     KOUNT           ;FINISHED ?
13 07456 000773           JMP     LOAD            ;NO
14 07457 060300 XB:       NIOP    0
15 07460 151404           MOV     2,2,SZR         ;CHECKSUM ERROR ?
16 07461 000573           JMP     ERR             ;YES
17 07462 000551           JMP     FILE
18 07463 000000 KOUNT:    0
```

```
19 07464 000300 ADDRT:   0
20
21                               ;ROUTINE TO READ A CHARACTER FROM TTY
22                               ;AC0=CHARACTER RIGHT JUSTIFIED
23
24 07465 054450 GETC:    STA     3,SGET        ;SAVE RETURN
25 07466 060110          NIOS    TTI           ;START TTY
26 07467 063510          SKPBZ   TTI           ;WAIT FOR TTY
27 07470 000777          JMP     .-1
28 07471 062610          DIAC    0,TTI         ;GET CHAR.
29 07472 024446          LDA     1,MSK         ;AC1=177
30 07473 123400          AND     1,0           ;SAVE RIGHT 7 BITS
31 07474 004424          JSR     PUTC          ;ECHO BACK CHARACTER
32 07475 034442          LDA     3,CR          ;CHECK FOR CR
33 07476 116404          SUB     0,3,SZR       ;SKIP IF CR
34 07477 000405          JMP     GETA          ;CHECK FOR ILLEGAL CHAR
35 07500 020441          LDA     0,LF
36 07501 004417          JSR     PUTC          ;CR - GENERATE LF
37 07502 020435          LDA     0,CR          ;RESTORE CR
38 07503 002432          JMP     @SGET
39 07504 024410 GETA:    LDA     1,C70         ;CHECK GREATER THAN 0
40 07505 122432          SUBZ#   1,0,SZC
41 07506 000571          JMP     QUES          ;ILLEGAL CHAR
42 07507 024404          LDA     1,C57
43 07510 106432          SUBZ#   0,1,SZC
44 07511 000566          JMP     QUES          ;AGAIN ?
45 07512 002423          JMP     @SGET         ;NOT ILLEGAL OR CR - RETURN
46 07513 000057 C57:     57
47 07514 000070 C70:     70
48 07515 000505 SIZR:    JMP     SIZY
49 07516 000000 KONST:   0                     ;TIMING CONSTANT
50 07517 000556 KONA:    JMP     KONB          ;CONTINUE SETTING CONSTANT
51
52                               ;ROUTINE TO OUTPUT CHARACTER TO TTY
53                               ;AC0=CHARACTER RIGHT JUSTIFIED
54
55 07520 061111 PUTC:    DOAS    0,TTO         ;OUTPUT A CHARACTER
10004 ,MAIN
01 07521 063511          SKPBZ   TTO           ;WAIT
02 07522 000777          JMP     .-1
03 07523 101004          MOV     0,0,SZR       ;SKIP IF NULL CHAR
04 07524 001400          JMP     0,3           ;NULL RETURN
05 07525 054411          STA     3,SPUT        ;SAVE RETURN
06 07526 020411          LDA     0,CR          ;OUTPUT CR
07 07527 004771          JSR     PUTC
08 07530 020411          LDA     0,LF          ;OUTPUT LF
09 07531 004767          JSR     PUTC
10 07532 102400          SUB     0,0           ;RESTORE NULL
11 07533 002403          JMP     @SPUT         ;NOT NULL RETURN
12 07534 000545 SIZW:    JMP     SIZZ
13 07535 000000 SGET:    0
14 07536 000000 SPUT:    0
15 07537 000015 CR:      15
16 07540 000177 MSK:     177
17 07541 000012 LF:      12
18 07542 054414 OUT:     STA     3,SAVX
19 07543 176440          SUBO    3,3
20 07544 024752          LDA     1,KONST       ;GET TIMING CONSTANT
21 07545 125401          INC     1,1,SKP
22 07546 000000          0
23 07547 063500 XC:      SKPDN   0
24 07550 000775          JMP     .-3
25 07551 062677          IORST
26 07552 061077          61077         ;NEW EQUIP IORST
27 07553 175203          MOVR    3,3,SNC       ;DO WE HAVE A FULL WORD ?
28 07554 000770          JMP     OUT+2         ;NO
29 07555 002401          JMP     @SAVX         ;YES RETURN
30 07556 000000 SAVX:    0
31 07557 000517 SIZA:    JMP     SIZX          ;RETURN
32                               ;OCTAL TO BINARY CONVERSION
33                               ;INPUT CHAR UNTIL CR
34                               ;CONVERT TO FULL 16 BITS
35                               ;AC2=CONVERTED OCTAL NUMBER
36
37 07560 054436 OCTAN:   STA     3,SAVEA       ;SAVE RETURN
```

```
38 07561 152400          SUB     2,2
39 07562 004743 OCTL:    JSR     GETC        ;GET A CHAR
40 07563 034754          LDA     3,CR        ;CHECK FOR CR
41 07564 116415          SUB#    0,3,SNR     ;SKIP IF NOT CR
42 07565 002431          JMP     @SAVEA
43 07566 034446          LDA     3,C7        ;AC3=MASK FOR 3 BITS
44 07567 163400          AND     3,0         ;AC0=RIGHTMOST 3 BITS
45 07570 153120          ADDZL   2,2         ;SHIFT AC1 LEFT 3
46 07571 151120          MOVZL   2,2
47 07572 113000          ADD     0,2         ;ADD IN NEW BITS
48 07573 000767          JMP     OCTL        ;LOOP
49 07574 000007 C7:      7
50
51                                           ;ROUTINE TO CONVERT BINARY TO OCTAL
52                                           ;16 BITS TO ASCII CHARACTERS
53                                           ;AC1=INTEGER TO BE CONVERTED
54
55 07575 054421 BNOCT:   STA     3,SAVEA     ;SAVE RETURN
  .RDXO .MAIN
01 07576 152620          SUBZR   2,2         ;AC2=100000
02 07577 020414 LOOP:    LDA     0,C60       ;ASCII ZERO
03 07600 146443          SUBO    2,1,SNC     ;STILL PLUS IF NO CARRY
04 07601 101401          INC     0,0,SKP     ;INC ASCII CHAR
05 07602 147001          ADD     2,1,SKP     ;TOO MUCH - ADD BACK
06 07603 000775          JMP     .-3
07 07604 004714          JSR     PUTC
08 07605 151220          MOVZR   2,2         ;SHIFT ONE BIT
09 07606 151220          MOVZR   2,2
10 07607 151224          MOVZR   2,2,SZR     ;LAST DIGIT
11 07610 000767          JMP     LOOP        ;NO
12 07611 002405          JMP     @SAVEA
13 07612 000503 NOM:     JMP     NOM         ;JMP TO START OF EXEC
14 07613 000060 C60:     60
15 07614 000000 FNO:     0                   ;FILE NUMBER
16 07615 000000 SNO:     0                   ;SEARCH FILE NUMBER
17 07616 000000 SAVEA:   0
18
19 07617 000000 CR:      0
20 07620 000000 LDA:     0
21 07621 000007 FCOUN:   7
22 07622 024537 SIZY:    LDA     1,X0
23 07623 147000          ADD     2,1         ;SET LAST OF THE INST.
24 07624 044535          STA     1,X0        ;FOR THE DEVICE CODE
25 07625 044526          STA     1,KONZ
26 07626 024470          LDA     1,DIAG
27 07627 147000          ADD     2,1
28 07630 044466          STA     1,DIAG
29 07631 044466          STA     1,DIAG+1
30 07632 002702          JMP     SIZM        ;RETURN
31 07633 152400 FILE:    SUBO    0,0
32 07634 040741          STA     0,SNO       ;CLEAR SEARCH FLAG
33 07635 020762          LDA     0,C0
34 07636 004652          JSR     PUTC
35 07637 024414 FILET:   LDA     1,FCO
36 07640 044423          STA     1,FCOD      ;STORE MODIFIED INST.
37 07641 020760          LDA     0,FCOUN     ;GET CHAR COUNT
38 07642 040756          STA     0,LDA
39 07643 020462 FCOD:    LDA     0,FLDA      ;MODIFY THIS LOC.
40 07644 004654          JSR     PUTC        ;PRINT CHAR
41 07645 010776          ISZ     FCOD        ;BUMP POINTER
42 07646 014752          DSZ     LDA         ;FINISHED ?
43 07647 000774          JMP     .-4         ;NO
44 07650 024744 FILEO:   LDA     1,FNO
45 07651 004724          JSR     BNOCT       ;CONVERT FILE #
46 07652 000524          JMP     WHOA        ;GET ANOTHER DIAG
47 07653 000000 FCO:     0                   ;MODIFIED WHEN WRITTEN ON
48                                           ;CASSETTE TAPE TO BE FCOD:
49 07654 020416 ERR:     LDA     0,ERRT
50 07655 040465          STA     0,ERRF      ;MODIFY INSTRUCTION.
51 07656 020416          LDA     0,ERRA      ;GET CHAR COUNT
52 07657 040414          STA     0,ERRB
53 07660 020737          LDA     0,C0
54 07661 004637          JSR     PUTC
55 07662 020453 ERRF:    LDA     0,ERRM      ;GET CHAR FOR OUTPUT
```

```
;0006 .MAIN
01 07663 004635        JSR     PUTC            ;PRINT
02 07664 010776        ISZ     ERRF            ;BUMP CHAR POINTER
03 07665 014436        DSZ     ERRB            ;ARE WE FINISHED ?
04 07666 000774        JMP     .-4             ;NO
05 07667 024725        LDA     1,FNO           ;GET FILE NO AND PRINT
06 07670 004705        JSR     BNOCT
07 07671 063077        HALT
08 07672 000000  ERRT: 0
09 07673 000300  ERRB: 0
10 07674 000013  ERRA: 13
11 07675 040455  KON6: STA     0,KONX          ;STORE CONSTANT
12 07676 000461        JMP     SIZA            ;RETURN
13 07677 020403  QUES: LDA     0,QUESM         ;GET QUESTION MARK
14 07700 004620        JSR     PUTC            ;PRINT IT
15 07701 000407        JMP     NEXTO           ;TRY AGAIN
16 07702 020077  QUESM: .TXT   "? "
17       000000
18 07704 020043  FN:    .TXT   "# "
19       000000
20 07706 100000  DELAY: 100000
21 07707 170707  IO:    170707
22 07710 020707  NEXTO: LDA    0,CR
23 07711 004607        JSR     PUTC
24 07712 020772        LDA     0,FN
25 07713 004605        JSR     PUTC            ;OUTPUT FILE #
26 07714 004644        JSR     OCTBN           ;GET NEW FILE #
27 07715 052700        STA     2,SNO           ;STORE SEARCH FILE #
28 07716 060300  DIAG:  NIOP   0
29 07717 062303        NIOP   0                ;START UP CASSETTE
30 07720 020766        LDA    0,DELAY          ;WAIT FOR CASS TO SPEED UP
31 07721 000401        JMP    .+1
32 07722 101403        INC    0,0,SNC
33 07723 000770        JMP    .-2
34 07724 000606        JMP    NOWA             ;NOW GET EXEC
35 07725 020114  FLOA:  .TXT  "L O A D E D  "
36       020117
37       020101
38       020104
39       020105
40       020104
41       020040
42       000000
43 07735 020103  ERRM:  .TXT  "C H K S U M    E R R  "
44       020110
45       020113
46       020123
47       020125
48       020115
49       020040
50       020105
51       020122
52       020122
53       020040
54       000000
55
56              EMERGENCY/BOOTSTRAP PROGRAM
57
58 07751 004200  XX:    JSR    200              ;JUMP TO EXEC
59 07752 000300  KONX:  0                       ;CONSTANT FOR BOOTSTRAP
60 07753 000000  KONZ:  0                       ;DEVICE CODE
;0007 .MAIN
01 07754 152440  BEG:   SUB    2,2              ;CLEAR AC2
02 07755 176440         SUB    3,3              ;CLEAR AC3
03 07756 024774         LDA    1,KONX           ;GET TIMING CONSTANT
04 07757 125401         INC    1,1,SKP          ;INC CONSTANT
05 07760 000000         0
06 07761 063600  XD:    SKPDN  0                ;IS DONE SET ?
07 07762 000775         JMP    .-3              ;NO
08 07763 062677         IORST                   ;YES, CLEAR DONE
09 07764 061077  XE:    61077                   ;NEW EQUIP IORST
10 07765 175203         MOVR   3,3,SNC          ;MOVE BIT FOUND
11 07766 000770         JMP    .-10             ;NOT FINISHED WITH 16 BI
12 07767 055177         STA    3,177,2          ;STORE WORD AWAY
13 07770 151400         INC    2,2              ;BUMP ADDRESS POINTER
```

```
14 07771 014177         DSZ     177             ;FINISHED WITH EXEC YET
15 07772 000763         JMP     .-15            ;GO BACK FOR NEXT WORD
16 07773 020756         LDA     0,XX            ;GET JSR INST
17 07774 040770         STA     0,XE            ;STORE IT
18 07775 000747         JMP     XE              ;GO THERE
19 07776 063077 WHOA!   HALT                    ;HALT AT TOP MEMORY
20 07777 000711         JMP     NEXTD           ;WHAT FILE NOW
21                      .END WHOA!
```

.SRT8 .MAIN — SYMBOL TABLE (CROSS REFERENCES)

| Symbol | Addr | Ref 1 | Ref 2 | Ref 3 | Ref 4 | Ref 5 | Ref 6 |
|---|---|---|---|---|---|---|---|
| A2RR | 007320 | 1/16 | | | | | |
| ADDRL | 007366 | 2/11 | | | | | |
| ADDRT | 007464 | 2/49 | 3/09 | 3/11 | 3/19 | | |
| ADDRX | 010005 | 7/26 | | | | | |
| BEG | 007754 | 7/01 | | | | | |
| BNOCT | 007575 | 3/06 | 4/55 | 5/45 | 6/06 | | |
| CR | 007617 | 3/03 | 5/19 | 5/33 | 5/53 | 6/22 | |
| CS7 | 007513 | 3/42 | 3/46 | | | | |
| C68 | 007613 | 5/02 | 5/14 | | | | |
| C7 | 007574 | 4/43 | 4/49 | | | | |
| C7R | 007514 | 3/39 | 3/47 | | | | |
| C77 | 007375 | 2/18 | 2/21 | | | | |
| CHECK | 010003 | 7/24 | | | | | |
| CON | 007373 | 1/39 | 2/16 | | | | |
| CONST | 007317 | 1/15 | 1/40 | 1/41 | 2/05 | 2/16 | |
| COUNT | 010004 | 7/25 | | | | | |
| CR | 007537 | 3/32 | 3/37 | 4/06 | 4/15 | 4/48 | |
| DELAY | 007706 | 6/20 | 6/30 | | | | |
| DIAG | 007716 | 5/26 | 5/28 | 5/29 | 6/20 | | |
| DIGID | 007374 | 2/17 | 2/36 | | | | |
| ERR | 007654 | 3/16 | 5/49 | | | | |
| ERRA | 007674 | 5/51 | 6/10 | | | | |
| ERRB | 007673 | 5/52 | 6/03 | 6/09 | | | |
| ERRF | 007662 | 5/50 | 5/55 | 6/02 | | | |
| ERRM | 007735 | 5/55 | 6/13 | | | | |
| ERRT | 007672 | 5/49 | 6/08 | | | | |
| EXEC | 007323 | 1/16 | 1/19 | | | | |
| FCO | 007653 | 5/35 | 5/47 | | | | |
| FCOD | 007643 | 5/36 | 5/39 | 5/41 | | | |
| FCOUN | 007621 | 5/21 | 5/37 | | | | |
| FILE | 007633 | 3/17 | 5/31 | | | | |
| FILED | 007656 | 5/44 | | | | | |
| FILET | 007637 | 5/39 | | | | | |
| FLOA | 007725 | 5/39 | 6/35 | | | | |
| FN | 007704 | 6/10 | 6/14 | | | | |
| FNO | 007614 | 2/52 | 3/05 | 5/15 | 5/44 | 6/05 | |
| FNUMB | 010006 | 7/27 | | | | | |
| FROM | 007371 | 1/19 | 2/14 | | | | |
| FROMX | 007370 | 1/20 | 2/13 | | | | |
| GETA | 007504 | 3/34 | 3/39 | | | | |
| GETC | 007465 | 3/24 | 4/39 | | | | |
| ID | 007707 | 6/21 | | | | | |
| K1000 | 007372 | 1/25 | 2/15 | | | | |
| KONA | 007517 | 1/24 | 3/50 | | | | |
| KONB | 007675 | 3/50 | 6/11 | | | | |
| KONST | 007516 | 1/23 | 3/49 | 4/28 | | | |
| KONX | 007752 | 6/11 | 6/59 | 7/03 | | | |
| KONZ | 007753 | 5/25 | 6/60 | | | | |
| KOUNT | 007463 | 2/46 | 3/12 | 3/18 | | | |
| LF | 007541 | 3/35 | 4/08 | 4/17 | | | |
| LOA | 007620 | 5/20 | 5/30 | 5/42 | | | |
| LOAD | 007451 | 2/56 | 3/02 | 3/08 | 3/13 | | |
| LOOP | 007977 | 5/02 | 5/11 | | | | |
| MOVE | 007347 | 1/39 | | | | | |
| MSIZE | 007367 | 1/30 | 2/08 | 2/09 | 2/12 | | |
| MSK | 007540 | 3/29 | 4/16 | | | | |
| NEXTD | 007710 | 6/15 | 6/22 | 7/20 | | | |
| NOW | 007415 | 2/30 | 3/07 | 5/13 | | | |
| NOWA | 007612 | 5/13 | 6/34 | | | | |

.SRT9 .MAIN

| Symbol | Addr | Ref 1 | Ref 2 | Ref 3 | Ref 4 | Ref 5 | Ref 6 | Ref 7 | Ref 8 |
|---|---|---|---|---|---|---|---|---|---|
| OCTBN | 007560 | 4/37 | 4/26 | | | | | | |
| OCTL | 007502 | 4/39 | 4/48 | | | | | | |
| OUT | 007542 | 2/37 | 2/40 | 2/43 | 2/45 | 2/48 | 2/51 | 3/00 | |
| | | 4/18 | 4/28 | | | | | | |

| | | | | | | | | |
|---|---|---|---|---|---|---|---|---|
| PUTC | RR7528 | 3/P4 | 3/31 | 3/36 | 3/55 | 4/P7 | 4/P9 | 5/P7 |
| | | 5/34 | 5/40 | 5/54 | 6/R1 | 6/14 | 6/23 | 6/25 |
| QUES | RR7677 | 3/41 | 3/44 | 6/13 | | | | |
| QUESM | PR7702 | 6/13 | 6/16 | | | | | |
| RECC | R1RRRR | 7/P1 | | | | | | |
| SAVEA | RR7616 | 4/37 | 4/42 | 4/55 | 5/12 | 5/17 | | |
| SAVX | RR7556 | 4/18 | 4/29 | 4/38 | | | | |
| SET | RR7538 | 3/24 | 3/38 | 3/45 | 4/13 | | | |
| SIZA | RR7557 | 4/31 | 6/12 | | | | | |
| SIZIT | PR7331 | 1/25 | 1/35 | 2/23 | | | | |
| SIZR | PR7515 | 2/33 | 3/48 | | | | | |
| SIZW | RR7534 | 4/12 | 5/30 | | | | | |
| SIZX | RR7376 | 2/19 | 4/31 | | | | | |
| SIZY | PR7622 | 3/48 | 5/22 | | | | | |
| SIZZ | RR7492 | 2/P3 | 4/12 | | | | | |
| SMO | PR7615 | 2/54 | 5/16 | 5/32 | 6/27 | | | |
| SPUT | PW7536 | 4/P5 | 4/11 | 4/14 | | | | |
| TOP | PR7365 | 1/43 | 2/18 | | | | | |
| WMOA | RR7776 | 1/15 | 2/16 | 5/46 | 7/19 | 7/33 | | |
| XA | PR7362 | 2/P7 | 2/24 | 2/26 | | | | |
| XB | RR7457 | 2/27 | 2/29 | 3/14 | | | | |
| XC | RR7547 | 2/3P | 2/32 | 4/23 | | | | |
| XD | RR7761 | 5/22 | 5/24 | 7/R6 | | | | |
| YE | RR7764 | 7/P9 | 7/17 | 7/18 | | | | |
| XX | RR7751 | 6/58 | 7/16 | | | | | |
| .ABUF | B1RR07 | 7/28 | | | | | | |
| .RRUF | RR7RR2 | 7/29 | | | | | | |
| .CBUF | R30RR2 | 7/38 | | | | | | |
| .DBUF | R42RRR | 7/31 | | | | | | |
| .WORD | R47777 | 7/32 | | | | | | |

We claim:

1. A control system for reading data stored on a magnetic tape into a computer comprising a tape drive and readout system including a motor, said magnetic tape storing a program thereon represented by sine waves of two different audio frequencies, one frequency representing a "0" bit and the other frequency representing a "1" bit, said magnetic tape supported by said tape drive system for movement upon operation of said motor, a Schmitt trigger circuit coupled to said tape drive and readout system to a pulse waveform representing the "1" and "0" bits represented on said tape, a flip-flop coupled to the Schmitt trigger and a NAND circuit coupled to said flip-flop, a computer, said NAND circuit coupled to said computer for providing program data signals to said computer, said flip-flop resettable by a timing signal from said computer, said computer providing control signals to control the operation of the tape drive and readout system, said control system including a monostable flip-flop coupled to a bistable flip-flop, said bistable flip-flop coupled to said NAND circuit and to means for controlling energy to said motor, the appearance of first and second control signals from said computer within a predetermined period of time causing the motor to be energized and the NAND circuit to be enabled whereas if no second control signal appears after the first control signal within said predetermined period of time the motor remains de-energized and the NAND circuit is disabled.

2. A system for storing data in a computer comprising a tape drive and readout system including a motor, means for converting data stored on the tape to signals representative of "1" and "0" bits for provision to a computer, first means for controlling the supplying of bits to the computer, a control system coupled to said first means responsive to computer control signals for controlling the flow of bits to said computer by said first means and for controlling the energizing of said motor, said control system comprising a monostable flip-flop coupled to a bistable flip-flop which is coupled to a means for energizing said motor, the appearance of first and second control signals from the computer within a predetermined period of time causing the motor to be energized and the first means to permit bits to be provided to the computer whereas if no second control signal appears after the first control signal within said predetermined period of time the motor remains de-energized and the first means is disabled.

* * * * *